T. Prosser,
Steam-Boiler Condenser.
No. 2,254. Reissued May 22, 1866.
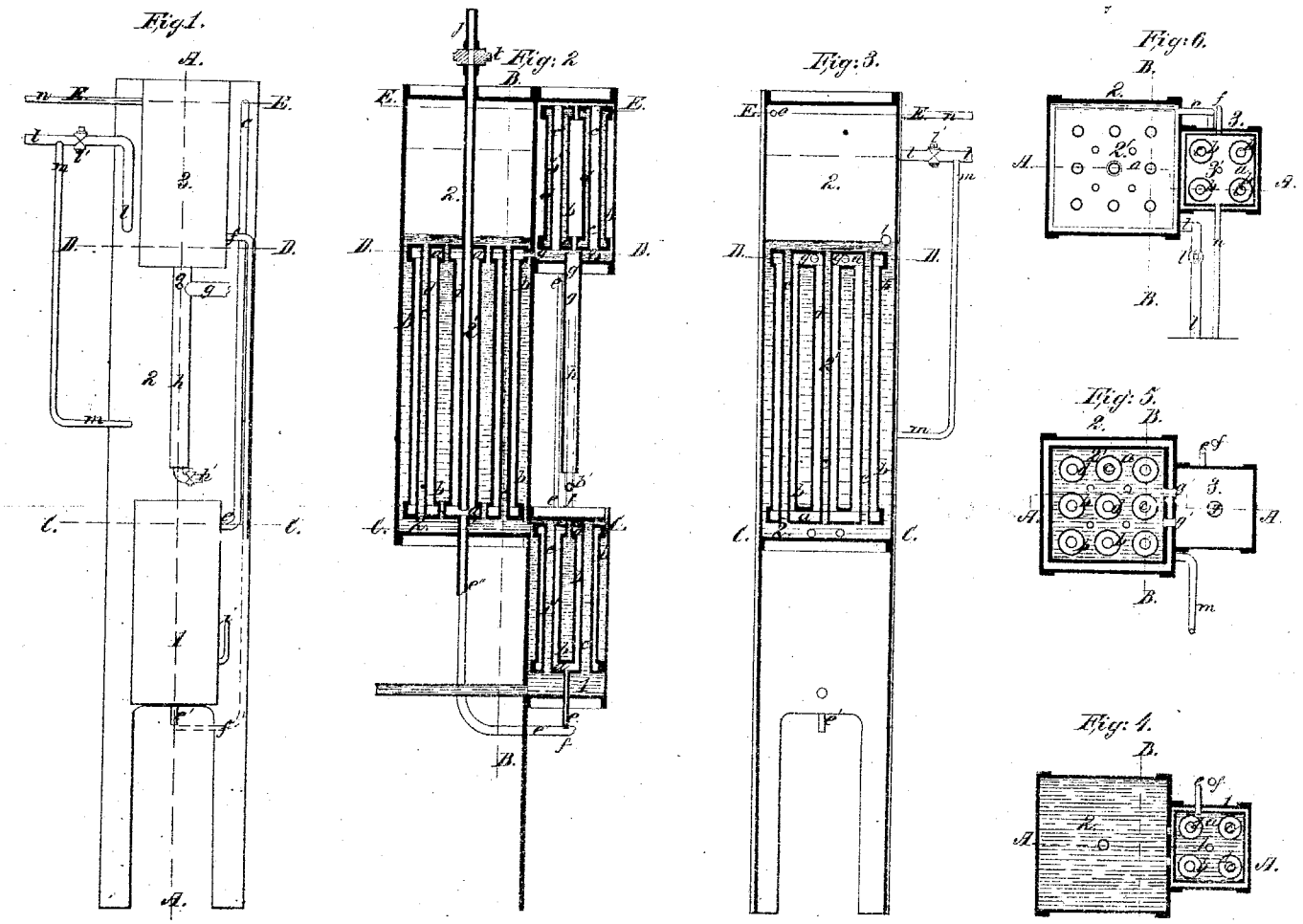

BEST AVAILABLE COPY

UNITED STATES PATENT OFFICE.

THOMAS PROSSER, OF NEW YORK, N. Y.

IMPROVEMENT IN SURFACE-CONDENSERS.

Specification forming part of Letters Patent No. 18,861, dated December 15, 1857; antedated October 31, 1854; Reissue No. 2,254, dated May 22, 1866.

*To all whom it may concern:*

Be it known that I, THOMAS PROSSER, of the city, county, and State of New York, have invented a new and Improved Surface-Condenser for Steam-Engines and other Purposes; and I do hereby declare that the following is a full, clear, and exact description of the same, reference being had to the accompanying drawings.

My condenser consists of two hollow slabs, such as that for which a patent, No. 10,450 was granted to me 24th January, 1854, or other equivalent chambers communicating by means of annular spaces with each other, such annular spaces being formed, by means of tubes, one within the other, the inner ones passing quite through both chambers, while the outer ones merely enter into them; and I, by preference, combine three such condensers, which I call, respectively, the "heater-condenser," the "main condenser," and the "distilling-condenser," arranged one above another, each in its own cistern, to form one complete condenser or condensing apparatus.

The bottom cistern first receives the cold condensing-water, while the distilling-condenser therein receives the vapor of a portion of that same water after it has become sufficiently heated by passing through the cistern of the main condenser. Each of these two condensers has a pipe leading from its lowest part through the bottom of its respective cistern, and from these pipes the water is drawn by means of two pumps, which force it through the upper or heater condenser into the boiler.

The cistern in which the heater-condenser is placed first receives the exhaust-steam from the engine, or other steam to be condensed, and thereby the water within the heater-condenser has its temperature increased, while the uncondensed steam passes into the main condenser, together with the waste resulting from condensation.

All the steam which has become condensed before entering the apparatus, together with any filth that may accumulate in the exhaust or inlet pipe, is collected in a vessel or catch-pit below it, and goes to waste. The uncombined or free air contained in the two internal condensers is allowed to escape, with the distilled water, through a pipe from the bottom of each by means of a branch pipe therefrom, and in the case of the main condenser a stop-cock is necessary for closing the same when working under pressure, and thereby (when the condensing-water is properly limited) causing the water in its cistern to boil sufficiently to supply the distilling-condenser with vapor for condensation to make up for waste and other purposes. In conjunction with this is a stop-cock to regulate the quantity of exit hot condensing-water which shall be allowed to escape. The rest escapes in a colder state from some lower part of the apparatus.

It will thus be seen that the main condenser, as well as the distilling-condenser, are both internal condensers, the first condensing the steam entering from the engine or other apparatus, and the second condensing the vapor from the hot well or main cistern, while the heater-condenser acts upon the steam externally to condense only a portion of it. When the steam is free to escape into the atmosphere through the condenser its temperature will scarcely exceed the boiling-point, and consequently the water in the heater-condenser can never reach it, much less can that in the main condenser, even when there is a deficient supply of water for condensation.

The working under a pressure within the condenser has, therefore, for its object the supplying of feed-water at a high temperature and vapor from the hot well of a sufficient elasticity to force itself in sufficient volume into the distilling-condenser below.

Of course the apparatus admits of a variety of modifications without altering its main features, but the method of combining the three condensers as herein set forth appears the best; but that the nature of my invention and the means which I adopt of carrying the same into effect may be fully understood, I will proceed to describe the drawings annexed, first premising that the same marks of reference refer alike to similar parts in each figure.

Figure 1 is a front elevation of the two cisterns 1 and 3, containing the distilling-condenser and the heater-condenser, behind which is the main-condenser cistern 2. Fig. 2 is a vertical section through the center of Fig. 1 on the line A—that is to say, through the distilling-condenser, main condenser, and heater-condenser, together with the cisterns 1, 2, and 3, inclosing them. Fig. 3 is also a vertical section through the main condenser 2' and the cistern 2, which contains it, on the line marked B, Fig. 2. Figs. 4, 5, and 6 are horizontal sections through the foregoing Figs. 1, 2, and 3, and on the lines marked, respectively, C, D, and E.

The condensers 1′, 2′, and 3′ are each composed as follows: *a a* are the hollow slabs or chambers, *b b* the tubes connecting the top of the one with the bottom of the other, and *c c* the tubes passing through the tubes *b b*, as well as through the hollow slabs or chambers *a a*, forming annular spaces *d d*, within which nothing but steam and vapor, or the water resulting from their condensation, is allowed to enter. I will here remark that by "steam" I mean the eduction or exhaust steam from an engine, or steam entering the inlet-pipe of the condenser from any source, and by "vapor" I mean what is evaporated from the water in the cistern of the main condenser.

*e* is a pipe from the top of the cistern 2, to convey the vapor into the distilling-condenser 1′, at the bottom of which a pipe, *e′*, collects the results in water through the bottom of the cistern 1 containing it, and *e″* is a pipe leading from the bottom of the main condenser 2′ through the bottom of the cistern 2 containing it, for the purpose of collecting the water resulting from the condensation of the steam within the one, 2′, and of the vapor within the other, 1′. Each pipe must have a separate pump to draw off the water, but one pipe, *f*, may receive the discharge of both and convey it into the heater-condenser 3′, outside of which, and within the cistern 3 containing it, the clean steam first enters by the pipe *g*, having deposited all filth, together with the steam previously condensed, in the catch-pit *h*, from which it is blown off at intervals through the cock *h′*.

The steam, after acting upon the heater-condenser 3′, will have some portion condensed, and this is prevented from returning by the pipe *g* being continued higher than the holes *g′ g′* of communication with 2′, and therefore the whole escapes together through holes *g′ g′* into the main condenser 2′, when the water which surrounds it is supposed to be boiling and is contained in the cistern 2.

As the steam after it has left the cistern 3 is still hot enough to boil the water in the cistern 2, it is of course hot enough to produce a higher temperature in the heater-condenser 3′, through which the feed-water is forced into the boiler through the pipes *n* and *f*. At the bottom of the main-condenser cistern 2 the water is much colder than at the top, and of course the steam is also colder and has become water in consequence of condensation. This water is nevertheless collected at a high temperature, and through the medium of the pipe *f*, as before stated, pumped, together with that from the distilling-condenser 1′, into and through the heater-condenser 3′ into the boiler.

*i*, Fig. 1, is a pipe from the bottom of condenser 1′, to allow of the escape of any free or uncombined air, or the same may be effected through the pipe *e′*.

*j*, Fig. 1, is also a pipe for a similar purpose to *i*, but proceeds upward from the top of the bottom hollow slab of condenser 2′, as also to enable an engine to which this condenser may be applied instantly to assume the character of a non-condensing high-pressure one. In fact it will assume that character automatically when the operation of the condenser 1′ is not required, and also when the cock *k* is open in consequence of derangement to the pump or a deficient supply of condensing water, at the same time that any other source of feed-water supply is opened.

I will here remark that the cock *k* is only required to be shut when a recuperative supply of water to make up for the waste is required from the condenser 1′.

*l* is the waste-pipe, upon which a cock, *l′*, is placed to regulate the amount of water which shall be allowed to flow from the cistern 2 between the lines marked "high-water level" and "low-water level," the latter being produced by the pressure of the superincumbent vapor above the water; but lower than this the water must not be allowed to go, because the whole of the condensing-water will then make its exit through the pipe *m* into *l*, beyond the point where the cock *l′* has any control, as it is entirely open.

The cock *k* being shut, therefore the cock *l′* fully controls the temperature and consequent pressure of the vapor in the cistern 2 by allowing the whole or only a portion of the condensing-water to pass off through it, for none will pass by the pipe *m* when *l′* is open, in consequence of the column of water in *m* being so much heavier than that connected with the pipe *l*.

The proportional surface of each condenser will vary with circumstances; but ordinarily it is presumed that the distilling-condenser and the heater-condenser, each having from one-tenth to one-fifth as much surface as the main condenser, will give excellent results when the steam-boiler pressure is from eighty to one hundred pounds to the square inch and cut off from the engine at from one-half to two-thirds of the stroke.

The temperature of the feed-water will probably be on the average about 16° to 18° above that of the exit hot condensing-water, and the same below that of the exhaust-steam as it enters the heater-condenser cistern 3. This temperature is obtained in consequence of the small capacity of the annular condenser, into which the steam is expanded after having expanded first in the cylinder of the engine or other apparatus in which it is used before entering the condenser, and next in the heater-condenser cistern 3. The reason why so little difference of temperate is anticipated lies in the fact of water at high temperatures absorbing heat far more rapidly than at low temperatures, and particularly when in a state of violent ebullition, for it may be observed that water when heated to a less temperature than that necessary to produce ebullition absorbs heat very slowly, and, of course, very little can escape as vapor, but the moment violent ebullition commences the absorption is very rapid, as is evinced by the copious discharge of vapor. The absorption of caloric must be in proportion to its evolution, and as vaper contains in the same weight about six times as much as water at the same temperature, it is probable that the same proportion holds good with regard to the amount of caloric absorbed. Leslie asserts that water at 212° conducts heat five times more rapidly than it does at about 32°; and Parks made some experiments which went to show that hot water abstracts heat faster than iron will allow it to pass through, in the proportion of twenty-six to ten; but the culinary phenomenon of a boiling tea-kettle shows that the caloric will pass through the metallic bottom apparently without affecting it at all; nay, even its temperature will become reduced, inasmuch as the hand may be borne against it when the water boils, but not before.

I would observe that simultaneously with the entrance of the condensing-water into the cistern 1 the steam enters cistern 3, the latter passes through the holes $g'$ $g'$ into the condenser 2′, while the condensing-water, somewhat raised in temperature, passes from the cistern 1 into the cistern 2, and consequently outside of the condenser 2′, wherein the steam becomes condensed. At the same time the vapor from the cistern 2 enters condenser 1′ and becomes condensed also. Then the products of condensation of both steam and vapor commingle and are forced through the heater-condenser 3′ into the boiler.

In starting an engine to which my condenser may be applied, the cock $k$ should be left open for a few minutes to allow the air within the main condenser to escape, or it may be left open until necessary to close it in order to supply water to make up for the waste. If a moderate quantity only is required, the cock $l'$ may be left open, but if more is required it may be partially shut, which will increase the temperature of the vapor in proportion to the depression which it produces upon the surface of the water, which must never be allowed below the low-water line.

Now, it may be proper to observe that in consequence of the small portion of the condensing-water which is required to be evaporated to supply the waste there is no probability of the saturation being sufficient to cause a deposit upon the condenser to an injurious extent, far less than must have occurred in the boiler, wherein all the solid matter contained in the water must necessarily be deposited.

Ordinary lime-waters will, however, coat the condenser with carbonate of lime, which is readily removed, and once in one year will be sufficiently frequent. In the case of sea-water, however, the ordinary deposit is sulphate of lime; but as this does not deposit until the water is nearly saturated and the temperature amounts to 217° Fahrenheit, it is not contemplated that any difficulty will arise from this deposit, which is so ruinous to sea-going steamers. These facts were developed by Faraday nearly thirty years ago, but this is the first practical embodiment of them to the purposes of economic working of the steam-engine known to the writer.

In case of accident or non-supply of condensing-water, the water should be run out at the cistern 1, and the cock $k$ being open, the engine will work as a non-condensing engine, and the boiler may be supplied with feed-water by means which will readily suggest themselves. If, however, the hand-hole covers in the main-condenser cistern are removed, so as to allow a free ingress and egress of air, a portion of the steam will still be condensed, and still more if a blower is made to force the air into the cistern. The waste condensing hot water may be made to pass through another condenser-like apparatus, which may be called an "attemperator," for the purpose of warming air or water, whereby a large portion of the fuel consumed may be utilized, far more indeed than by any other means, and finally, the entire condensation may be produced partly with air and partly with water.

It is scarcely necessary to add that the waste boiling-hot condensing-water and the vapor arising therefrom are both available for cooking purposes at no cost whatever for fuel.

In conclusion I may state that the amount of condensing-water needed with my condenser will ordinarily be about four times that of the feed-water, which is only about five per cent. of the amount ordinarily required for other surface-condensers.

The operation of my condenser, when used for any other purpose than in connection with a steam-engine, will be started and continue in the same manner as when it is used in connection with a steam-engine, as above described.

What I claim as my invention, and desire to secure by Letters Patent, is—

A condenser consisting of two hollow slabs or other equivalent chambers connected together by concentric tubes and communicating with each other by means of the annular spaces formed by said tubes, said slabs and tubes being arranged within a cistern and operating substantially as herein specified.

THOMAS PROSSER.

Witnesses:
HENRY T. BROWN,
GEO. W. REED.